United States Patent [19]

Clark

[11] 4,028,837

[45] June 14, 1977

[54] RELEASE MECHANISM FOR FISHING APPARATUS

[76] Inventor: Norman E. Clark, 59 E. Utica St., Oswego, N.Y. 13126

[22] Filed: June 3, 1976

[21] Appl. No.: 692,447

[52] U.S. Cl. .................................. 43/43.12; 43/17
[51] Int. Cl.² ................. A01K 91/00; A01K 95/00
[58] Field of Search ........................... 43/43.12, 17

[56] References Cited
UNITED STATES PATENTS

| | | | |
|---|---|---|---|
| 2,749,649 | 6/1956 | Fitzsimmons | 43/43.12 |
| 3,193,964 | 7/1965 | Hurst | 43/43.12 |
| 3,659,370 | 5/1972 | Ritter | 43/43.12 |
| 3,816,954 | 6/1974 | Bissonette | 43/43.12 |
| 3,974,589 | 8/1976 | Henze et al. | 43/43.12 |

*Primary Examiner*—John F. Pitrelli
*Assistant Examiner*—Daniel J. Leach
*Attorney, Agent, or Firm*—D. Peter Hochberg

[57] ABSTRACT

A release mechanism for a downrigger or the like for releasably securing the fishing line to the downrigger and for releasing the fishing line in response to the exertion of a predetermined minimum horizontal force substantially regardless of the magnitude of vertical force exerted on the fishing line.

11 Claims, 7 Drawing Figures

RELEASE MECHANISM FOR FISHING APPARATUS

BACKGROUND OF THE INVENTION

The present invention relates to fishing devices, and in particular to release mechanisms for fishing apparatus such as downriggers for carrying fishing lines to the depths of a body of water and for releasing the line in response to a strike by a fish.

Many devices are known for carrying fishing lines into the depths of bodies of water. In some instances, particularly where the water is less than ten feet in depth and where the water movement relative to the fishing line is insufficient to prevent the line from reaching a desired depth, it is the general practice of a fisherman to use the weight of the bait or lure to carry the line to the desired depth, or to use a supplemental weight such as a lead sinker. In the foregoing situation, the weight of the bait, line, or sinker is normally relatively small compared to the force exerted by a fish striking the bait or lure, so that there is no impediment to the sensing of a strike or the landing of a fish.

However, when the fishing is done in deep bodies of water, and particularly when the water movement relative to the fishing line is substantial as when the fisherman is trolling from a moving boat, the weight of the bait, lure or lead sinker is insufficient to carry the weight to the usual fishing depths. The use of a very heavy sinker would not suffice, because although it might carry the line to the desired depths, the weight of the sinker would make the sensing of a strike by a fish very difficult; moreover, the sports fisherman would find the fight of a fish "masked" by the weight of the sinker. Therefore, it is a practice among fishermen who are fishing under the latter conditions to employ a downrigger for carrying the line into the body of water.

A downrigger is a weighted device for releasably holding a fishing line and carrying it deep into a body of water. The downrigger is intended to release the fishing line when a fish strikes the bait or lure secured to the line. The downrigger is generally used by a fisherman trolling from a moving boat, and a line separate from the fishing line secures the downrigger to the boat. In practice, the fisherman clips the fishing line to the downrigger a distance from the bait or lure sufficient to position the bait or lure away from the device so as not to alarm the fish, and the downrigger is lowered into the water by its line to the desired fishing depth. The clip used to attach the fishing line to the downrigger includes a release mechanism for releasing the fishing line from the downrigger in response to a strike by a fish. The release mechanism is provided with means for releasing the line only when the strike force exceeds some threshold value to avoid premature releases in response to a drag force from the water. When the release mechanism is actuated, the fishing line separates from the downrigger. The slack in the line is eventually taken up by the forward progress of the boat and/or the action of a fish. The fisherman may note this by the action of the fishing rod only when the line becomes taut.

Although various downriggers known in the prior art fulfill their intended function, they do have various deficiencies which are not found in the present invention. One shortcoming of known downriggers relates to the effect of upward force on the downrigger release mechanism. The force of a fish strike is substantially in the horizontal direction (and any vertical force component is relatively very small), so the release mechanism should only respond to horizontal forces. The upward forces which exist could ideally allow a fisherman to apply enough tension to the line to cause the rod to bend, so that the rod would straighten upon a strike, signaling the release of the release mechanism. Such upward force should not affect the threshold release force of the release mechanism. Unfortunately, prior release mechanisms respond to these upward forces by prematurely releasing a retained line, drastically changing the release force threshold, and/or changing the point of attachment of the line to the mechanism.

A known downrigger release mechanism incorporates a clamp for releasably holding a ring through which a fishing line extends. The line is twisted to fix it relative to the downrigger with which the release mechanism is associated. When a fish strikes the bait or lure on the line, the ring is pulled from the clamp and the line untwists as it is freed from the downrigger. The twisting of fishing line in narrow radii ofter permanently damages the line and can substantially weaken it in the area of the twist.

Perhaps the most serious shortcoming of some prior downriggers is the inability to adjust the release force for releasing the line from the downrigger to compensate for variations in drag on the line during trolling. This is a serious defect, because it is common to vary trolling speeds, and bait or lure weights, and the release mechanism must have a release force threshold which exceeds the highest anticipated drag force to avoid release from the inherent drag of the entire rig. Thus, it is very likely that weak strikes would go undetected when the drag force is significantly below the release force threshold. On the other hand, when the drag is unusually high because of water currents, high trolling speeds, or the like, premature release could very well occur despite the absence of fish strikes.

Another disadvantage of prior downriggers relates to the time delay between a strike and the indication thereof to the fisherman. In the conventional downrigger, the fishing line is clamped with some fixed clamping force to the downrigger. When a fish strikes the bait or lure, it must pull with sufficient force to overcome the clamping force. After release occurs, the fish may pull with insufficient strength to make any change in the amount of bending of the fishing rod readily observable, so that the fisherman must wait until the slack in the line is taken up by the forward motion of the boat before he can recognize the presence of a fish. Many fish are lost when the hook is not set instantly after a strike, and the rod attended immediately.

Some known downriggers employ hardware which is fixed in place on the fishing line. Such obstacles on the line interfere with the free play of a fish, and prevent the retrieval of the section of line between the lure or bait and such hardware.

Thus, the effectiveness of prior downriggers is substantially limited by the invariability of the release force threshold of the release mechanism which secures the fishing line to the downrigger, by the responsiveness of the release mechanism to vertical force components, by the delay between a strike and the indication thereof to the fisherman, by the damage caused to the fishing line when some downriggers are used, and/or by the interference caused by hardware fixed on the fishing line.

SUMMARY OF THE INVENTION

An object of the present invention is to provide an improved release mechanism for a downrigger or the like, whose release force threshold is variable by the fisherman for adapting the force at which release occurs to different fishing conditions.

Another object of the invention is to provide an improved release mechansim for a downrigger or the like, which releases a secured fishing line in substantially exclusive response to horizontal forces.

A further object is to provide release mechanism for a downrigger or the like, which indicates the existence of a strike immediately upon the occurrence of the strike.

Yet another object of the invention is to provide an improved release mechanism for releasably securing a fishing line to a downrigger or the like without damaging the line.

A general object of the invention is to provide a release mechanism having the foregoing properties which is practicable to use, effective in use, and susceptible of economical manufacture. Other objects will be apparent from the description to follow and from the appended claims.

The above objects are achieved according to the preferred embodiment of the invention by the provision of a downrigger comprising a weight for carrying a fishing line to a desired depth, securing means biased to a released condition for securing a fishing line to the downrigger, a trigger mechanism releasably holding the securing means in a housing fixed on the downrigger, and a release mechanism for actuating the trigger mechanism to free the line from the downrigger weight in response to a predetermined, variable, horizontal release force threshold.

DESCRIPTION OF THE PREFERRED EMBODIMENT

The preferred embodiment of the invention comprises a downrigger release mechanism constructed to release a secured line in response to a predetermined minimal horizontal force. The mechanism includes a spring loaded trigger which responds to a release force by ejecting the fishing line from the downrigger, to provide the fisherman with an immediate notice of a strike by a fish.

Figure 1:
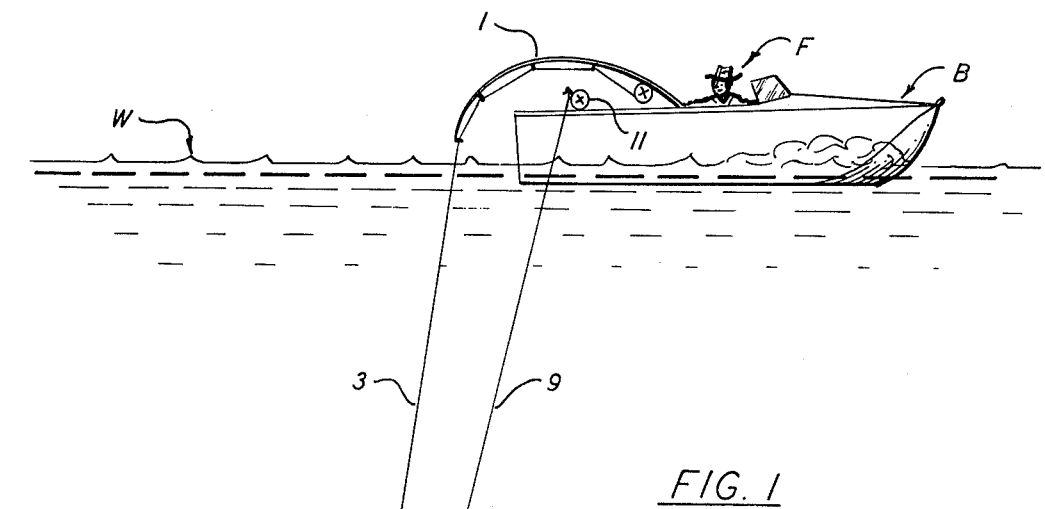
FIG. 1 is a pictorial representation of a downrigger according to the invention used in a trolling operation.

Referring now to the drawings, there is shown in FIG. 1 a fisherman F trolling in a body of water W from a boat B. The fisherman's equipment includes rod 1, from which extends a fishing line 3 having a lure 5 trailing the boat and the fishing equipment. The latter equipment further includes a downrigger 7 secured to boat B by a sturdy line 9 wound in part about a reel 11 preferably attached to boat B. Downrigger 7 is a heavy apparatus, constructed to carry line 3 deep into the body of water, and to hold the line at a depth determined primarily by the amount of line 9 let out and the speed of boat B in the water. Downrigger 7 can be fabricated from a heavy metal such as iron or steel, and includes a body 13 having an attached upper fin 15 and an attached lower fin 16 for stablizing downrigger 7. Line 9 can conveniently be attached to the downrigger by slipping the line through a hole 17 and typing a suitable knot. Line 3 is releasably secured to downrigger 7 by a release mechanism 19, which is the essential part of this embodiment of the invention.

Figure 2:
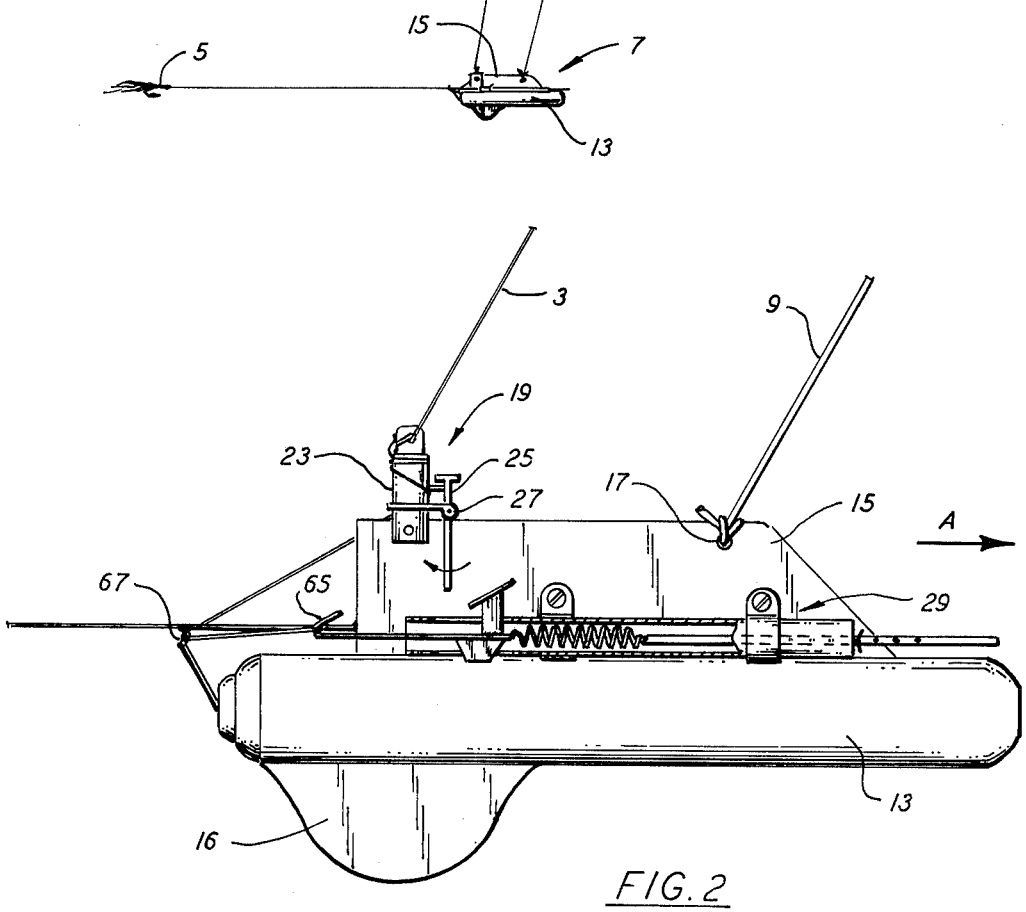
FIG. 2 is a side view of a downrigger according to the invention in the loaded condition.
Figure 3:
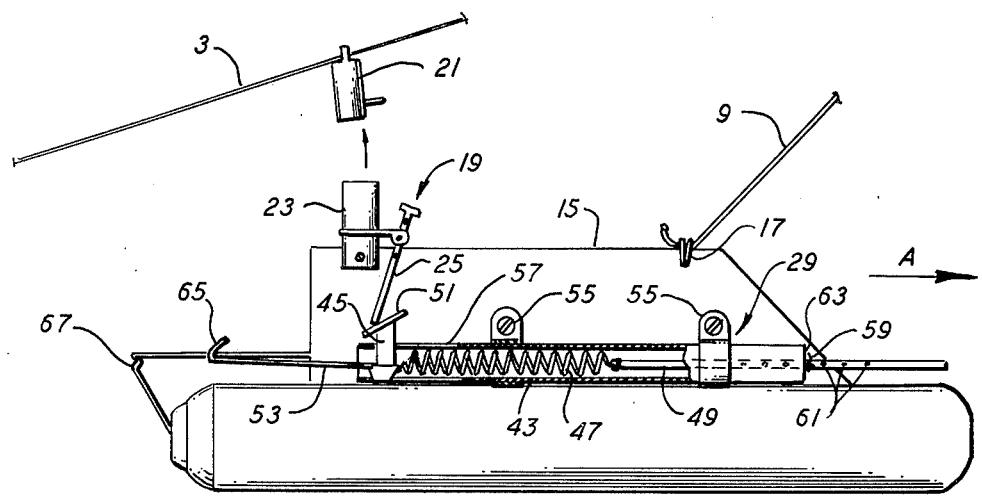
FIG. 3 is a side view of a downrigger according to the invention in the releasing condition.
Figure 4:
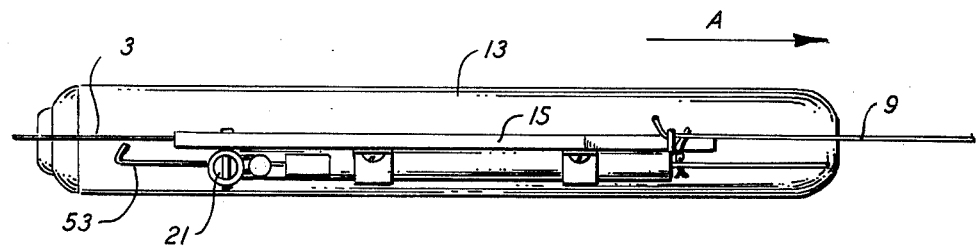
FIG. 4 and 5 are top and front end views of the device shown in FIG. 2.

As shown most clearly in FIGS. 2–4, the release mechanism includes a plunger 21 slidably and releasably disposed in a housing 23, a trigger 25 rotatably mounted on a pivot pin 27 attached to fin 15, and a line retention assembly 29.

Figures 5, 6, 7:
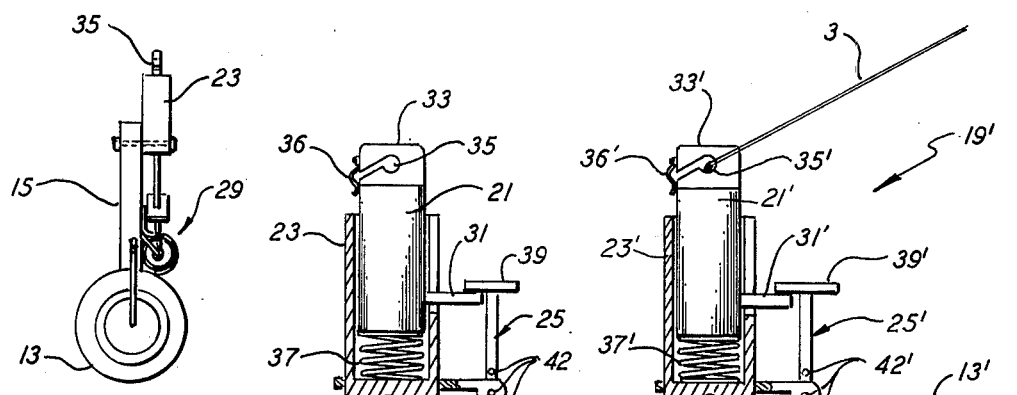
FIG. 6 is a detailed, sectional view of the trigger mechanism incorporated in the embodiment shown in FIGS. 1-5.
FIG. 7 is a detailed sectional view of another embodiment of the invention.

Referring to FIG. 6, plunger 21 may be seen to comprise a cylindrical body portion from which extends a finger 31 transverse to the axis of the cylindrical portion, and a flattened portion 33 through which a labyrinth slot 35 extends for receiving fishing line 3. A resilient retaining clip 36 is attached to plunger 21 and extends across the mouth of slot 35, so that a fishing line can be slipped under the clip and retained in the slot. Housing 23 has cylindrical interior walls for receiving plunger 21 in sliding engagement. A vertical slot extends through the wall of housing 23 in a direction parallel with the axis of the housing cylinder for receiving in sliding engagement, finger 31. A spring 37 is disposed at the bottom of the hollow cylindrical portion of housing 23 between plunger 21 and the base of housing 23. When the release mechanism is loaded as explained below, spring 37 biases plunger 21 outwardly from housing 23.

Release mechanism 19 further includes the trigger arm 25 mentioned earlier, the latter member including a head 39 perpendicular to an elongate trigger arm 41. A plurality of holes 42 extend through trigger arm 41 for alternatively receiving pivot pin 27. When release mechanism 19 is in a loaded condition, plunger 21 compresses spring 37, and is held in that position by virtue of the engagement of finger 31 by head 39. The position of plunger 21 in housing 23, and the force exerted by spring 37 on plunger 21, is determined virtually exclusively by the hole 42 through which pivot pin 27 extends. It may be seen that when trigger 25 rotates clockwise about pin 27, head 39 disengages from finger 31, and spring 37 exerts an ejection force on plunger 21. As explained below, the rotation of trigger 25 is accomplished by the exertion of a force at the lower end of that member. The fulcrum of trigger 25 is determined by the hole 42 through which pin 27 extends. The higher the hole, the smaller the amount of force which must be applied to the lower end of trigger arm 41 to effect the disengagement of head 39 from finger 31.

Line retention mechanism 29 includes an elongate cylindrical housing 43 in which are disposed a trigger tab mount 45, a helical spring 47, and a spring tension adjustment rod 49. Tab mount 45 comprises a post on which is disposed an angularly oriented trigger tab 51, and from which extends a spring guide 53. Housing 43 is attached to fin 15 by means of metal straps 55, which are fastened to the fin by means of screws, welds, or other fastening means. Line retention mechanism 29 is disposed such that a portion of trigger arm 41 is in the path of movement of trigger tab 51. Tab post 45 extends through a slot 57 in the upper portion of housing 43. The tension of spring 47 is established by spring tension adjustment rod 49, which is held in place by a positioning pin 59 which extends through one of a number of holes 61 transverse to the axis of rod 49. A cap 63 extends across the end of housing 43, and pin 59 engages cap 63 to hold rod 49 in place. The selection of the particular hole 61 through which pin 59 extends establishes the distance between tab 51 and trigger 19; the extent of the latter distance regulates in part the threshold force at which release is effected.

Spring guide 53 is a resilient wire having a hooked end 65, and, as explained later, is selected such that hook 65 will yield to release a retained fishing line upon a strike by a fish on the lure or bait attached to the free end of fishing line 3. A groove 67 is provided in the trailing end of weight 13 for guiding line 3 from cylinder 23 to guide 65.

Considering next the operation of the apparatus shown in FIGS. 1–6, the fisherman initially secures the free end of line 9 to fin 15 by tying a knot in the line after drawing it through hole 17. The free end of fishing line 3 is passed beneath retention clip 36 and into labyrinth slot 35 in plunger 21, and wrapped at least once about the plunger below finger 31. The plunger is then deposited in housing 23 with the line cinched between the inner walls of the housing and the exterior cylindrical wall of the plunger. It is important that the fishing line be wrapped around plunger 21 at a position such that the free end of line 3 is disposed sufficiently from downrigger 7 so that fish would not be disturbed by the presence of the downrigger. Generally, lure 5 would be attached before the fishing line is attached to the release mechanism, although this is simply a matter of convenience.

After fishing line 3 is cinched in place, the fisherman manually depressed plunger 21 into housing 23 to compress spring 37. Trigger 25 is rotated counterclockwise with head 39 disposed over finger 31, thereby retaining plunger 21 in place in housing 23 against the bias of spring 37. Line 3 is next placed in a groove 67 in the trailing end of fin 15 and placed in hook 65 with lure 5 disposed rearwardly of the apparatus.

Downrigger 7 is then lowered into the water by unwinding line 9 from reel 11, while fishing line 3 is unwound from the reel of fishing rod 1. Lines 9 and 3 are lowered to the desired depth, line 3 is tensioned to bend rod 1, and boat B is propelled forward in the direction indicated by arrows A so that lure 5 trails all of the foregoing apparatus. Downrigger 7 remains at a position closer to vertical line from boat B than lure 5 by virtue of its weight. When a fish strikes lure 5 with sufficient force to pull spring guide 53 forward sufficiently for trigger tab 51 to engage trigger 19 and rotate the latter element in the clockwise direction to release head 39 from finger 31, spring 37 ejects plunger 21 from housing 23 as shown in FIG. 3, and fishing line 3 opens hook 65 and slips out of groove 67. Line 3 is thus immediately freed from the downrigger, and fishing pole 1 springs upwardly immediately. The latter action gives the fisherman immediate notice of the strike and assists in the setting of the hook. After the release, plunger 21 slides freely on line 3, and has no noticeable affect on the movement of the fishing line or the play of the fish.

A modified and somewhat simplified version of the foregoing embodiment of the invention is illustrated in FIG. 7. The latter embodiment in effect dispenses with line retention assembly 29, and the equivalent of spring guide 53 is attached directly to trigger 25. Parts of the embodiment of FIG. 7 which correspond to parts in the embodiment of FIGS. 1–6, are ascribed like numerical designators with prime (') superscripts.

Thus, the apparatus shown in FIG. 7 includes a plunger 21' slidably disposed in a housing 23', and biased out of the housing by a spring 37'. Plunger 21' is releasably retained in housing 23' by virtue of the engagement of a head 39' of a trigger 25', with a finger 31' extending from plunger 21' through a slot in the wall of housing 23'. Trigger 25' is mounted for rotation on a pivot pin 42', which is selectively inserted through one of holes 42' which establish the fulcrum for the trigger.

A spring 101, secured at one end to trigger 25' by its extension through a hole 103 in the trigger and at its other end to an adjustable pin 105 attached to the downrigger body 13', biasses trigger 25' counterclockwise to oppose the ejection of plunger 21'. Pin 105 can be adjusted by changing the location of the illustrated cotter pin to change the tension in spring 101. A line retention member 53' having a resilient hook 65' extends transversely from trigger 25'.

In order to load release mechanism 19', fishing line 3 is run beneath clip 36' into slot 35', wound around plunger 21', and cinched between housing 23' and the plunger when the latter is inserted in housing 23'. The line is drawn inside of hook 65' through intermediate guide means (not shown) corresponding to groove 67, and attached to the lure or bait.

When a fish strikes the preceding lure or bait, the exerted force is applied to hook 65', and trigger 25' is rotated clockwise against the force of spring 101. When head 39' is disengaged from finger 31', spring 37' ejects plunger 21' from housing 23', and line 3 opens hook 65' and is freed therefrom. The fishing rod above the water springs upwardly while plunger 21' slides freely on line 3.

Various modification to the illustrated structure can be made, both to facilitate the operation of the apparatus and its manufacture. Downrigger body 13 can be elongated as shown, or spherical, or virtually any other shape consistent with carrying the fishing line to desired depths. The structure associated with ejecting the line from the downrigger can take various forms. The ejection energy is provided by a coil spring, but many other energy sources can be used, such as other types of springs, electrical or magnetic means, explosive devices, etc. Similarly, many types of triggers, and means for actuating such trigger, can be used. The means for connecting the fishing line to the means for actuating the trigger can be similar to hooks 65 and 65', or can take any variety of forms of clips or the like.

The embodiments of the invention described herein accomplish the objects of the invention. A downrigger release mechanism is provided which is actuable to release a secured fishing line in response to a variable threshold force determined by the fisherman. The mechanism is responsive to virtually only horizontal forces. The occurrence of a strike by a fish is indicated immediately to the fisherman. The means by which the fishing line is secured to the downrigger is not damaging to the line. Apparatus according to the invention can be constructed so as to be practical to use, efficient in operation, and susceptible of economical manufacture.

The release mechanism according to the invention has been described in conjunction with a downrigger, but it finds similar applicability with other fishing apparatus such as conventional trolling equipment.

The invention has been described in detail with emphasis on preferred embodiments thereof, but variations and modifications within the spirit and scope of the invention may occur to those skilled in the art to which the invention pertains.

I claim:

1. A release mechanism for securing a fishing line to fishing apparatus, for releasing the fishing line from the apparatus in response to a strike by a fish, said release mechanism comprising:
   fishing line holding means having a gripping condition for gripping the fishing line and a releasing condition for releasing the fishing line from restraint by the fishing apparatus;
   ejection means actuable for transferring said fishing line holding means from the gripping condition to the releasing condition; and
   trigger means responsive to forces exerted on the fishing line and actuable for actuating said ejection means in response to the sensing of a release force on the fishing line corresponding to a strike by a fish.

2. The invention according to claim 1 and further comprising:
   threshold force establishing means operatively associated with said trigger means, for establishing a horizontal force threshold and for preventing actuation of said trigger means unless said horizontal force threshold is exceeded.

3. The invention according to claim 2 wherein:
   said trigger means comprises a trigger member movable from a cocked condition to a released condition for actuating said ejection means; and
   said threshold force establishing means comprises trigger moving means movable over a predetermined distance relative to said trigger member in response to horizontal forces exceeding said horizontal force threshold, for moving said trigger member to said released condition.

4. The invention according to claim 3 wherein said threshold force establishing means further comprises means for varying said predetermined distance.

5. The invention according to claim 2 wherein said threshold force establishing means comprises means for varying said horizontal force threshold.

6. The invention according to claim 1 wherein:
   said fishing line holding means comprises a plunger and a housing for receiving the plunger in sliding engagement, the fishing line being wrapped about said plunger and cinched between said plunger and said housing when said fishing line holding means is in the gripping condition.

7. The invention according to claim 6 wherein said ejection means comprises spring means for biassing said plunger out of said housing.

8. The invention according to claim 7 wherein said trigger means comprises a trigger member movable between a cocked position wherein said trigger member retains said plunger in said housing, and a released condition wherein said trigger member does not retain said plunger in said housing and said spring means ejects said plunger from said housing.

9. The invention according to claim 8 wherein said trigger member comprises a lever pivotal about a fulcrum, said trigger member including means for varying the position of said plunger to adjust the size of the release force.

10. The invention according to claim 8 wherein said trigger means further comprises:
    line retention means for engaging the fishing line between the free end of the line and said fishing line holding means and for moving said trigger member from the cocked position to the released position in response to the occurrence a horizontal force exceeding a predetermined horizontal force threshold.

11. The invention according to claim 10 wherein said line retention means comprises:
    a trigger actuation member movable a predetermined distance for moving said trigger member from the cocked position to the released position;
    a line retaining member connected to said trigger actuation member and movable by the fishing line for moving said trigger actuation member; and
    means for regulating the force required to move said trigger actuation member said predetermined distance for controlling the predetermined horizontal force threshold.

* * * * *